(12) United States Patent
Kim

(10) Patent No.: US 6,171,457 B1
(45) Date of Patent: Jan. 9, 2001

(54) METHOD OF FABRICATING LOW RESISTANCE, ANTI-REFLECTION CRT

(75) Inventor: Yeoung-Ku Kim, Seoul (KR)

(73) Assignee: LG Electronics, Inc., Seoul (KR)

(*) Notice: Under 35 U.S.C. 154(b), the term of this patent shall be extended for 0 days.

(21) Appl. No.: 09/103,376

(22) Filed: Jun. 24, 1998

(30) Foreign Application Priority Data

Jun. 25, 1997 (KR) .................................................. 97-27031

(51) Int. Cl.[7] .............................. C23C 14/34; B05D 5/06
(52) U.S. Cl. ................... 204/192.28; 204/192.23; 204/192.26; 204/192.27; 204/192.29; 427/162; 427/163.1; 427/163.3; 427/166; 427/167; 427/168
(58) Field of Search .................... 204/192.23, 192.26, 204/192.27, 192.28, 192.29; 427/162, 163.1, 163.3, 166, 167, 168, 69

(56) References Cited

U.S. PATENT DOCUMENTS

| | | | |
|---|---|---|---|
| 4,945,282 | * 7/1990 | Kawamura et al. ................... 313/479 |
| 5,579,162 | * 11/1996 | Bjornard et al. ................ 204/192.26 |
| 5,691,044 | * 11/1997 | Oyama et al. ........................ 428/216 |
| 5,770,258 | * 6/1998 | Takizawa et al. ..................... 427/64 |
| 5,869,129 | * 2/1999 | Aben et al. .......................... 427/162 |

\* cited by examiner

*Primary Examiner*—Rodney McDonald

(57) ABSTRACT

In the method of fabricating a CRT including a sputtering method for forming an anti-static layer and a spin-coating or spray-coating method for forming an anti-reflection layer on a CRT panel, a method of fabricating a low-resistance, anti-reflection CRT is characterized by applying a silicon oxide ($SiO_2$) coating between the anti-static layer and the anti-reflection layer by a sputtering method. As a result, the CRT has enhanced strength of layers and a low surface resistance. Also, the screen is provided with a charge protection function in the surface, with reflectivity of an external light being mitigated. As a result, it is possible to enhance the contrast characteristics of the screen, to avoid leaving fingerprints on the screen, and also to eliminate unpleasant feeling of static electricity.

16 Claims, 5 Drawing Sheets

METHOD OF FABRICATING LOW RESISTANCE, ANTI-REFLECTION CRT

BACKGROUND OF THE INVENTION

1. Field of the Invention

The present invention relates to a method of fabricating a CRT with a front surface having coating layers applied thereto and, more particularly, to a method of fabricating a CRT in which a silica ($SiO_2$) coating is interposed between an anti-static layer and an anti-reflection layer, unlike a conventional fabrication where the anti-static layer is formed on the external surface of a panel by a sputtering method aid the anti-reflection layer is then formed with a sot by a spin-coating method.

2. Description of the Background Art

Normally, an anti-static coating is applied to front surface of a CRT in order to provide display device with a more comfortable feeling of sight and eliminate static electricity generated across the screen.

The reason for this is based upon a problem concerning the human body and technology, and therefore, the surface of the CRT is provided with charge and reflection protecting capabilities in order to enhance the feeling of sight and in conformity with a request for the user's convenience in use.

The construction of a CRT that meets these requirements will be described with reference to FIG. 1 as follows.

FIG. 1 is a schematic view of a conventional CRT.

As shown in the FIG. 1 a conventional CRT includes two separate panels 1 and 2. The external surface of the panel 2 is coated with an anti-static layer 3 for eliminating electric charges which are formed across the front surface of the CRT due to an applied high voltage when the user switches a PC on or off, and with an anti-reflection layer 4 for preventing an external light such as emitted from an indoor fluorescent lamp from being reflected upon the front surface of the CRT to obstruct the user's sight.

FIGS. 2(a)–(e) are diagrams illustrating a process for fabricating a wherein reference numeral 5 indicates an anti-static layer, reference numeral 6 indicates an anti-reflection layer, reference numeral 7 indicates a fixing plate, reference numeral 8 indicates a polishing machine, reference numerals 9 and 13 indicate nozzles, reference numeral 11 indicates a rotational plate, and reference numeral 14 indicates a heater or an ultraviolet lamp.

When the external surface of the panel 2 with the anti-static layer 3 and the anti-reflection layer 4, indium-tin oxide (ITO) is first applied to the surface of the panel 2 by a sputtering method, forming the anti-static lever 3.

A sol containing silica ($SiO_2$) as a principal component is then applied to the surface of the anti-static layer 3 by a spin-coating method and the resulting material is fired (with a heat treatment), hardening the silica sol, to form the anti-reflection layer 4.

However, since indium-tin oxide (ITO) constituting the anti-static layer 3 is a metal, a problem arises in terms of adhesion between the indium-tin oxide (ITO) and the silica sol which forms the anti-reflection layer 4. This has an adverse effect upon the strength of layers.

Furthermore, if a coating is applied and fired (with a heat treatment), it is susceptible to an increase in the surface resistance.

Actually, the ITO layer has an increase in the surface resistance from 200–300 $\Omega/cm^2$ (or $\Omega/\square$) to 5000 $\Omega/\square$ after a heat treatment at 200° C. for 30 minutes.

In other words, the surface resistance of a coating must be in a range below $10^3$ $\Omega/\square$ so as to provide electric and magnetic fields in a monitor set, but this is not expected now to be realized in the conventional technology.

In an alternative method for forming the charge and anti-reflection layers, the front surface of a CRT is first cleaned and polished with cerox ($CeO_2$). The polished surface is washed with purified water and alcohol and dried.

The dried CRT is placed in a pre-heater in order to heat the surface of the CRT to be coated at 40 to 50° C. The front surface of the CRT is coated with a $SiO_2$ sol containing dispersed 3–5% Sb by a spin-coating or spray-coating method, forming an anti-static layer 3, and subsequently, another silica component which differs in the refractive index from that of the anti-static layer 3 is applied to the anti-static layer 3 to form an anti-reflection layer 4 for allowing even a long term use of PCs to reduce user fatigue and do no harm to the human body.

Herein, the anti-reflection layer 4 has an uneven surface for anti-glare formed by a spray-coating method. This is to make stains caused by the anti-reflection coating invisible, thereby decreasing the diffused reflectivity, and to eliminate the problem of fingerprints left on the anti-reflection layer 4.

However, some problems that involve foreign substances arise in forming the anti-reflection layer by a spin-coating or spray-coating method, such as difficulty in removal of chemicals, increasing defects of scratches on the surface of a panel and marks of adsorption.

Such an ARAS or AGRAS coating renders the surface resistance of the AS (Anti-Static) coating layer in the range of $10^{7-8}$ $\Omega/\square$ in conformity with the MPRII standard. However, this does not meet the TCO standard of most growing interest recently.

In a conventional spin(AS coating)-spin(AS coating) method, the AS layer is made of ITO which is very expensive and provides a surface resistance of $10^{5-6}$ $\Omega/\square$ which is not enough to satisfy the TCO standard, and a sol used in formation of the ITO coating provides an insufficient EMI shielding effect. It is further necessary to provide a correction circuit on the monitor set in order to meet the TCO standard in which the surface resistance shall be less than $10^3$ $\Omega/\square$.

SUMMARY OF THE INVENTION

Accordingly, an object of the present invention is to provide a method of fabricating a CRT where the front surface of the CRT is coated and, more particularly, to a method of fabricating a CRT in which a silica ($SiO_2$) coating is interposed between an anti-static layer and an anti-reflection layer whereby the CRT has an enhanced strength of layers and a low surface resistance and the screen is provided with a surface charge protection function with the reflectivity of an external light being mitigated, as a result of which it is possible to enhance the contrast characteristics of the screen, avoid leaving fingerprints on the screen, and also eliminate unpleasant feeling of static electricity.

To achieve these and other advantages and in accordance with the purpose of the present invention, as embodied and broadly described, in a method of fabricating a CRT including a sputtering method for forming an anti-static layer and a spin-coating or spray-coating method for forming an anti-reflection layer on a CRT panel, a method of fabricating a low-resistance, anti-reflection CRT is characterized by applying a silicon dioxide ($SiO_2$) coating between the anti-static layer and the anti-reflection layer by a sputtering method.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the wherein.

DETAILED DESCRIPTION OF PREFERRED EMBODIMENT

Hereinafter, a method of fabricating a low-resistance, anti-reflection CRT according to the present invention will be described with reference to the accompanying drawings.

Figure 1:
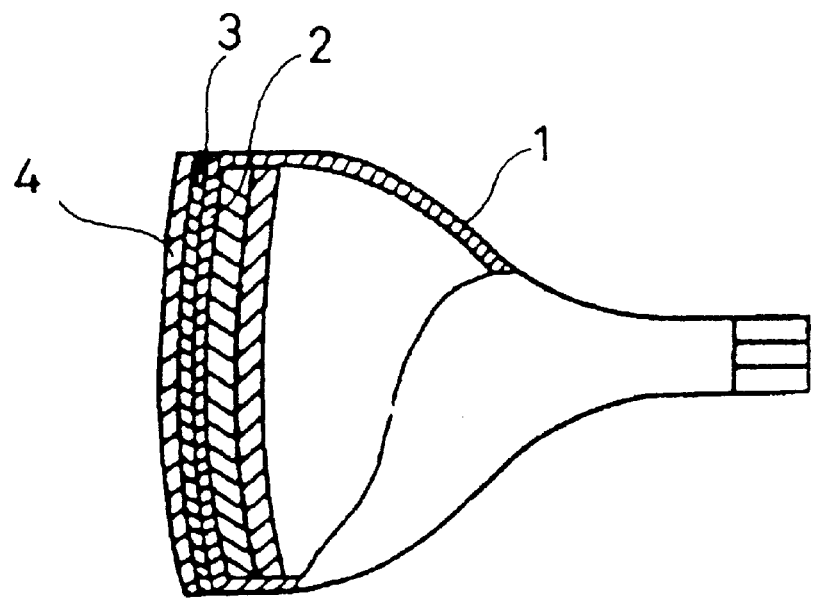
FIG. 1 is a schematic view of a conventional CRT provided with an anti-static layer and an anti-reflection layer.
Figure 2A:
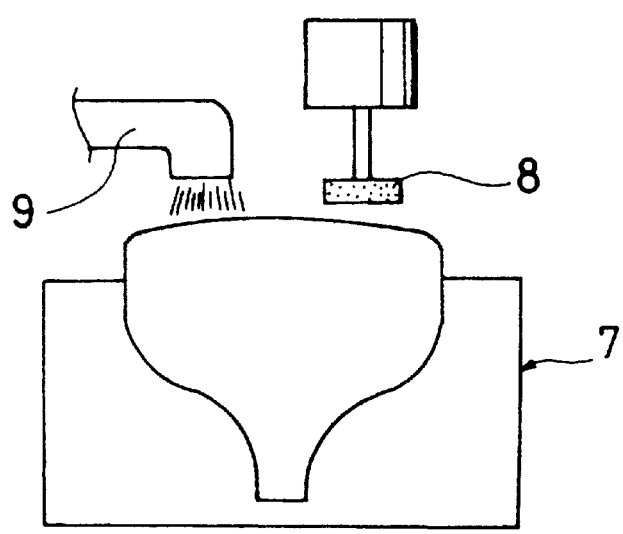
FIGS. 2(a)–(e) are diagrams illustrating a process of fabricating a conventional CRT with an anti-static layer and an anti-reflection layer.
Figure 2B:
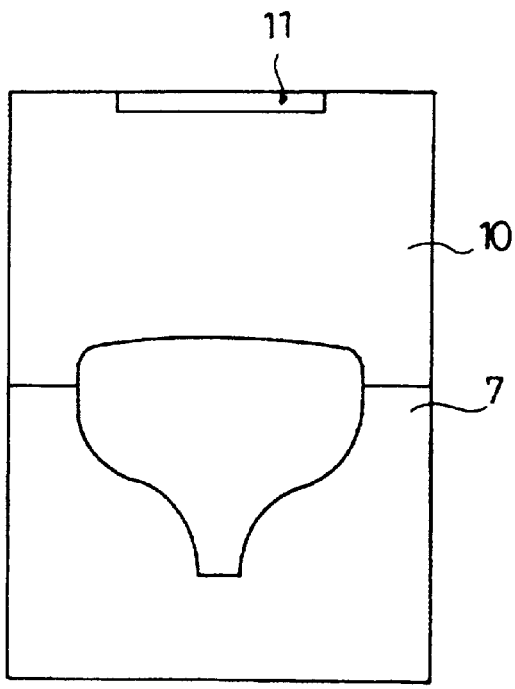
Figure 2C:
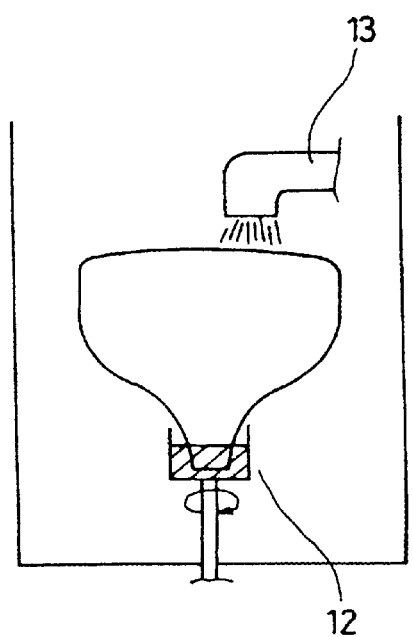
Figure 2D:
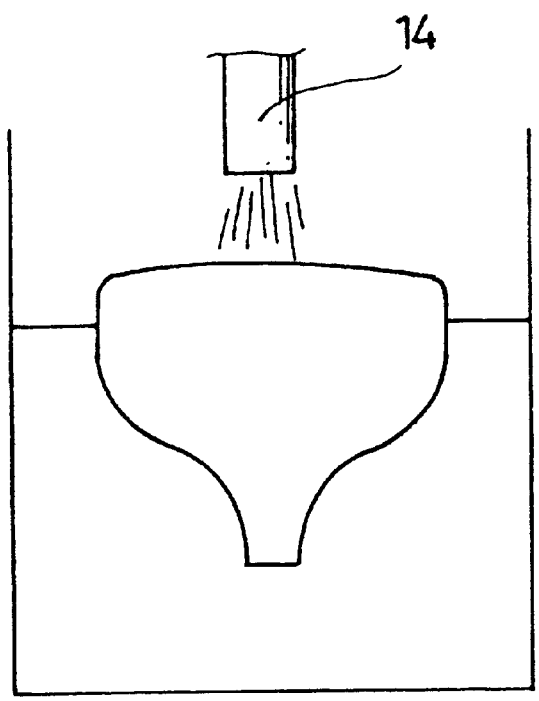
Figure 2E:
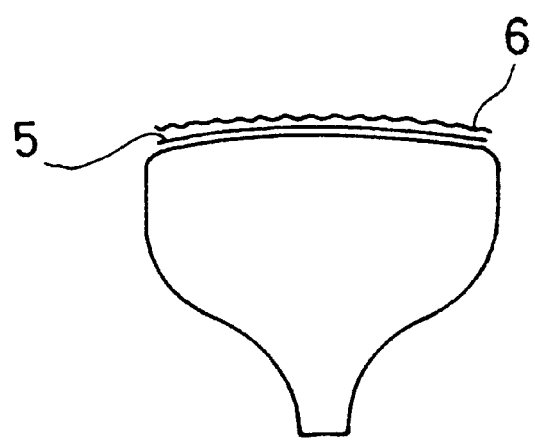
Figure 3:
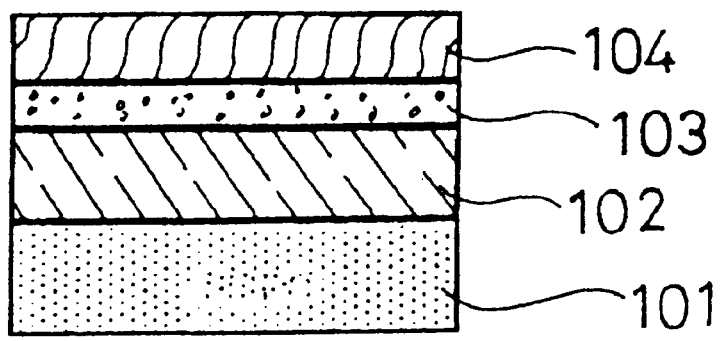
FIG. 3 is a cross-sectional view illustrating the preventive layers formed on the surface of a panel in a CRT of a present embodiment.

FIG. 3 is a cross-sectional view illustrating an embodiment of the present invention.

As illustrated in FIG. 3, the external surface of a panel 101 for a CRT is coated with an anti-static layer 102 by a sputtering method. A silica coating 103 containing silica ($SiO_2$) as a principal component is applied to the surface of the anti-static layer 102 by a sputtering method, and then, an anti-reflection layer 104 is applied to the resulting surface with a sol by a spin-coating method and fired.

In forming the ant-static layer 102, any one selected from the group consisting of indium-tin oxide (ITO), indium-zircon, indium oxide, zirconium oxide ($ZrO_2$) and their mixture is applied by a sputtering method.

This coating is preferably in the 100 to 500 Å range of thickness.

Following formation of the anti-static layer 102, any one selected from the group consisting of compositions containing silica ($SiO_2$) as a principal component and their mixture is applied by a sputtering method so as to form the silica coating 103.

Further, the anti-reflection layer 104 is formed with a sol containing as a principal component one selected from the group consisting of silicon (Si), silicon oxide ($SiO_2$) and their mixture by a spin-coating method.

The coating in this case is preferably 500 to 1500 Å in thickness and a weight ratio of a solid component in the silica sol is 0.5 to 2 wt. %.

Such a coating method will be described in further detail with an evaluation of the present invention in regards to the characteristics by way of an exemplary embodiment as follows.

Prior to forming a conductive layer, the panel surface 101 of a CRT is removed of foreign substances such as dusts. The front surface of the panel 101 is coated with indium-tin oxide (ITO) by a sputtering method so as to form the anti-static layer 102. Wherein the indium-tin oxide (ITO) is known to have a low resistance. Silica coating 103 that contains silica ($SiO_2$) as a principal component is applied by a sputtering method as well. The resulting material is then coated with a silica set where silicon dioxide ($SiO_2$) particles are dispersed by a spin-coating method; forming anti-reflection layer 104.

The sputtering method involves coating an object with target atoms generated when argon (Ar) gas ionized in a vacuum strikes a target, which is considered as a very excellent technique in regards to adhesive strength.

It is, therefore, possible to provide good adhesion between layers by application of a silica ($SiO_2$) coating between the anti-static layer and the anti-reflection layer by means of a sputtering method Further, the layers are rendered to have a low surface resistance and there is no fluctuation in the surface resistance before and after a beat treatment.

Figure 4:
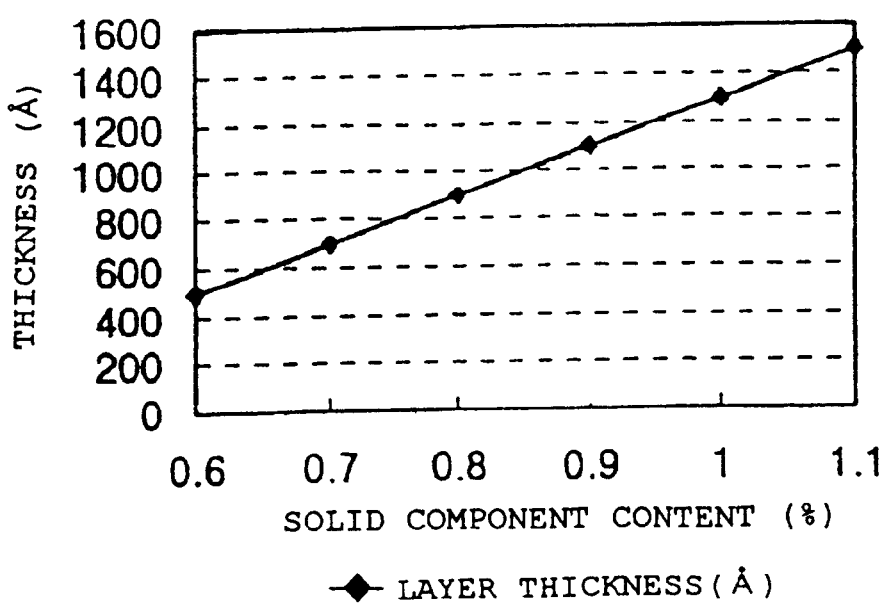
FIG. 4 is a graph showing changes in the layer thickness based on a solid component content in a silica sol.
Figure 5:
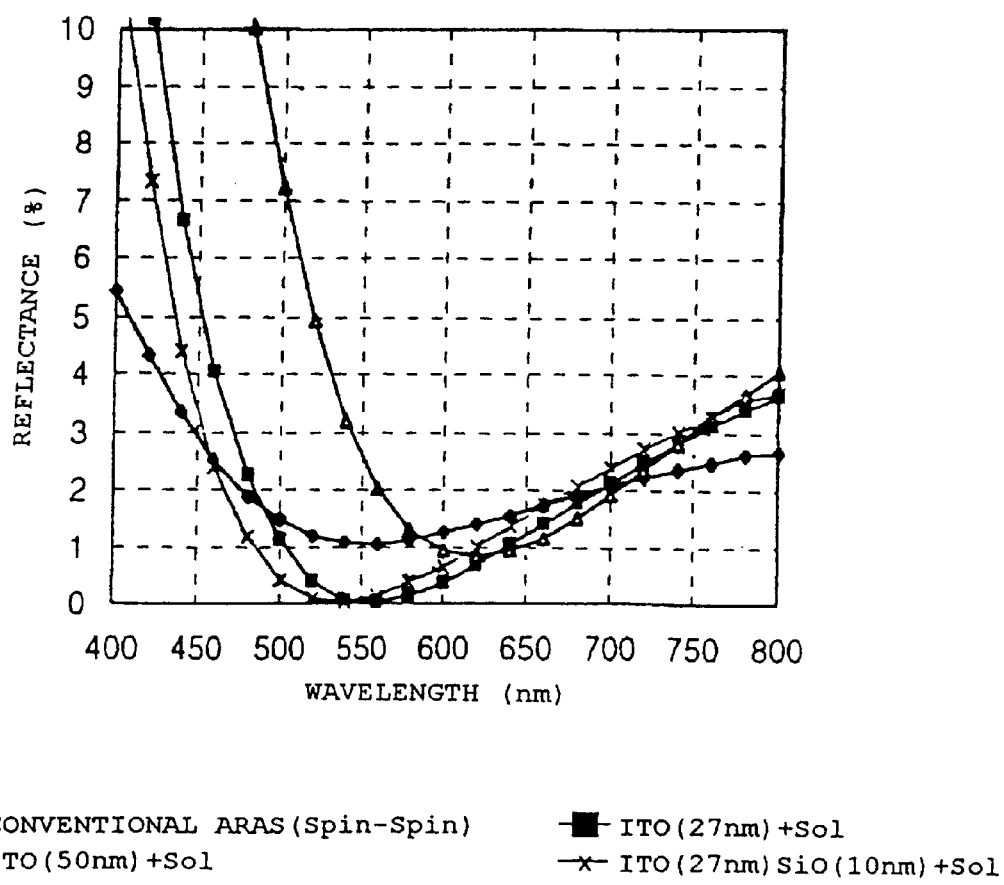
FIG. 5 is a graph showing a change in the reflectivity due to the respective coatings.

In accordance with an embodiment of the present invention, an indium-tin oxide (ITO) coating of 270 Å in thickness is applied to the front surface of a CRT by a sputtering method to form the anti-static layer 102. and subsequently, a silica ($SiO_2$) coating 103 is applied by a sputtering method to the thickness of around 100 Å and the resulting material is coated with a silica sol by a spin-coating method, allowing the anti-reflection layer 104 to be formed. Herein as it is apparent from the graph in FIG. 4 which shows a change in the layer thickness based on the solid component content in the layer, the layer is 1100 Å thick when it contains 0.9 wt. % of silica sol.

As a result of an evaluation of the above embodiment in regards to characteristics, the reflectivity is less than 0.1% at 550 nm in wavelength when the refractive index of the 270 Å anti-static layer 102 is 1.95 and the anti-reflection layer 104 has a thickness of 1200 Å with a refractive index of 1.35.

It is also found out that the surface resistance is $10^2$ Ω/□.

Furthermore, there is no change in the surface resistance before and after a firing subsequent to the coating steps.

Unlike the conventional method in which an ITO coating is applied by a sputtering method to form the anti-static layer 102 and a silica sol coating is applied by a spin-coating method to form the anti-reflection layer 104, the silica ($SiO_2$) coating 103 is interposed between the anti-static layer 102 and the anti-reflection layer 104 by a sputtering method in the present invention, as a result of which the layers have a low surface resistance, a reflectivity of less than 0.1% at 550 nm in wavelength, no change in the surface resistance before and after a heat treatment, and a good layer strength.

Such as in the present invention as described above, use is made of a sputtering method in forming a silica ($SiO_2$) coating between the anti-static layer and the anti-reflection layer, whereby adhesion between the layers becomes very excellent to enhance layer strength since the sputtering method used herein involves coating an object with target atoms generated when argon (Ar) gas ionized in vacuum strikes a target, and additionally, the layers have a low surface resistance and almost no change in the surface resistance before and after a firing.

Furthermore, a use of silica ($SiO_2$) component for the anti-reflection layer makes an application of coatings easier, reducing the cost and enhancing the productivity.

Therefore, the surface of a screen is provided with a charge protection function and the reflectivity of an external light is mitigated, as a result of which it is possible to enhance the contrast characteristics of the screen, avoid leaving fingerprints on the screen, and also eliminate unpleasant feeling of static electricity.

It will be apparent to those skilled in the art that various modifications and variations can be made in the method of fabricating a low-resistance, anti-reflection CRT according to the present invention without departing from the spirit or scope of the invention. Thus, it is intended that the present invention cover the modifications and variations of this invention provided they come within the scope of the appended claims and their equivalents.

What is claimed is:

1. A method of fabricating a CRT comprising the steps of:
   a) sputtering an anti-static layer on a CRT panel;
   b) sputtering a silica coating on the anti-static layer; and
   c) coating an anti-reflection layer on the silica coating, wherein the anti-reflection layer comprises a silica sol, a weight ratio of a solid component in the silica sol is 0.5 to 2 wt. %.

2. The method of fabricating of claim 1, wherein the anti-static layer is made of a material containing as a principal component one selected from a group consisting of indium-tin oxide (ITO), indium-zircon, indium oxide, zirconium oxide ($ZrO_2$) and their mixture, and the anti-reflection layer is made of a material containing as a principal component one selected from a group consisting of silicon (Si), silicon dioxide ($SiO_2$) and their mixture.

3. The method of fabricating of claim 1, wherein the anti-static layer is 100 to 500 Å thick and the anti-reflection layer is 500 to 1500 Å thick.

4. The method of fabricating of claim 1, wherein surface resistance of the anti-static and anti-reflection layers is $10^2$ $\Omega/cm^2$.

5. A method of fabricating a CRT comprising the steps of:
   a) sputtering an anti-static layer on a CRT panel;
   b) sputtering a silica coating on the anti-static layer; and
   c) coating an anti-reflection layer on the silica coating, wherein said step c) comprises spin-coating the anti-reflection layer on the silica coating.

6. The method of fabricating of claim 5, wherein the anti-static layer is made of a material containing as a principal component one selected from a group consisting of indium-tin oxide (ITO), indium-zircon, indium oxide, zirconium oxide ($ZrO_2$) and their mixture, and the anti-reflection layer is made of a material containing as a principal component one selected from a group consisting of silicon (Si), silicon dioxide ($SiO_2$) and their mixture.

7. The method of fabricating of claim 5, wherein the anti-static layer is 100 to 500 Å thick and the anti-reflection layer is 500 to 1500 Å thick.

8. The method of fabricating of claim 5, wherein surface resistance of the anti-static and anti-reflection layers is $10^2$ $\Omega/cm^2$.

9. A method of fabricating a CRT comprising the steps of:
   a) sputtering an anti-static layer on a CRT panel;
   b) sputtering a silica coating on the anti-static layer; and
   c) coating an anti-reflection layer on the silica coating, wherein said step c) comprises spray-coating the anti-reflection layer on the silica coating.

10. The method of fabricating of claim 9, wherein the anti-static layer is made of a material containing as a principal component one selected from a group consisting of indium-tin oxide (ITO), indium-zircon, indium oxide, zirconium oxide ($ZrO_2$) and their mixture, and the anti-reflection layer is made of a material containing as a principal component one selected from a group consisting of silicon (Si), silicon dioxide ($SiO_2$) and their mixture.

11. The method of fabricating of claim 9, wherein the anti-static layer is 100 to 500 Å thick and the anti-reflection layer is 500 to 1500 Å thick.

12. The method of fabricating of claim 9, wherein surface resistance of the anti-static and anti-reflection layers is $10^2$ $\Omega/cm^2$.

13. A method of fabricating a CRT comprising the steps of:
    a) sputtering an anti-static layer on a CRT panel;
    b) sputtering a silica coating on the anti-static layer; and
    c) coating an anti-reflection layer on the silica coating, wherein said step a) comprises sputtering indium-tin oxide as the anti-static layer and said step c) comprises coating a silica sol as the anti-reflection layer.

14. The method of fabricating of claim 13, wherein the anti-static layer is made of a material containing as a principal component one selected from a group consisting of indium-tin oxide (ITO), indium-zircon, indium oxide, zirconium oxide ($ZrO_2$) and their mixture, and the anti-reflection layer is made of a material containing as a principal component one selected from a group consisting of silicon (Si), silicon dioxide ($SiO_2$) and their mixture.

15. The method of fabricating of claim 13, wherein the anti-static layer is 100 to 500 Å thick and the anti-reflection layer is 500 to 1500 Å thick.

16. The method of fabricating of claim 13, wherein surface resistance of the anti-static and anti-reflection layers is $10^2$ $\Omega/cm^2$.

* * * * *